United States Patent [19]

Woerlee

[11] 4,006,993
[45] Feb. 8, 1977

[54] SHAFT MOUNTING ARRANGEMENT

[75] Inventor: Constantijn L. Woerlee, Zwijndrecht, Netherlands

[73] Assignee: Borg-Warner Corporation, Chicago, Ill.

[22] Filed: Nov. 25, 1975

[21] Appl. No.: 635,196

[52] U.S. Cl. .............................. 403/359; 403/365; 403/404
[51] Int. Cl.² ........................................... F16D 1/06
[58] Field of Search .......... 403/359, 383, 334, 350, 403/365, 259, 261, 404, 345

[56] References Cited
UNITED STATES PATENTS

| | | |
|---|---|---|
| 1,392,915 | 10/1921 | Clendenon ..................... 403/359 |
| 2,508,832 | 5/1950 | McAninch ..................... 403/359 |
| 2,675,257 | 4/1954 | Specht ........................ 403/361 X |
| 2,804,322 | 8/1957 | Herzog ........................ 403/265 X |
| 3,577,795 | 5/1971 | Bennett ....................... 403/359 X |

Primary Examiner—Andrew V. Kundrat
Attorney, Agent, or Firm—Aubrey L. Burgess

[57] ABSTRACT

An arrangement for providing a driving connection between a shaft and an essentially annular member, such as a gear, sprocket, bushing or the like, in which the shaft is provided with spaced flats, at least at one end, and the bore of the power transmission member is provided with complimentary surfaces to receive the shaft, generally with a light press fit.

4 Claims, 6 Drawing Figures

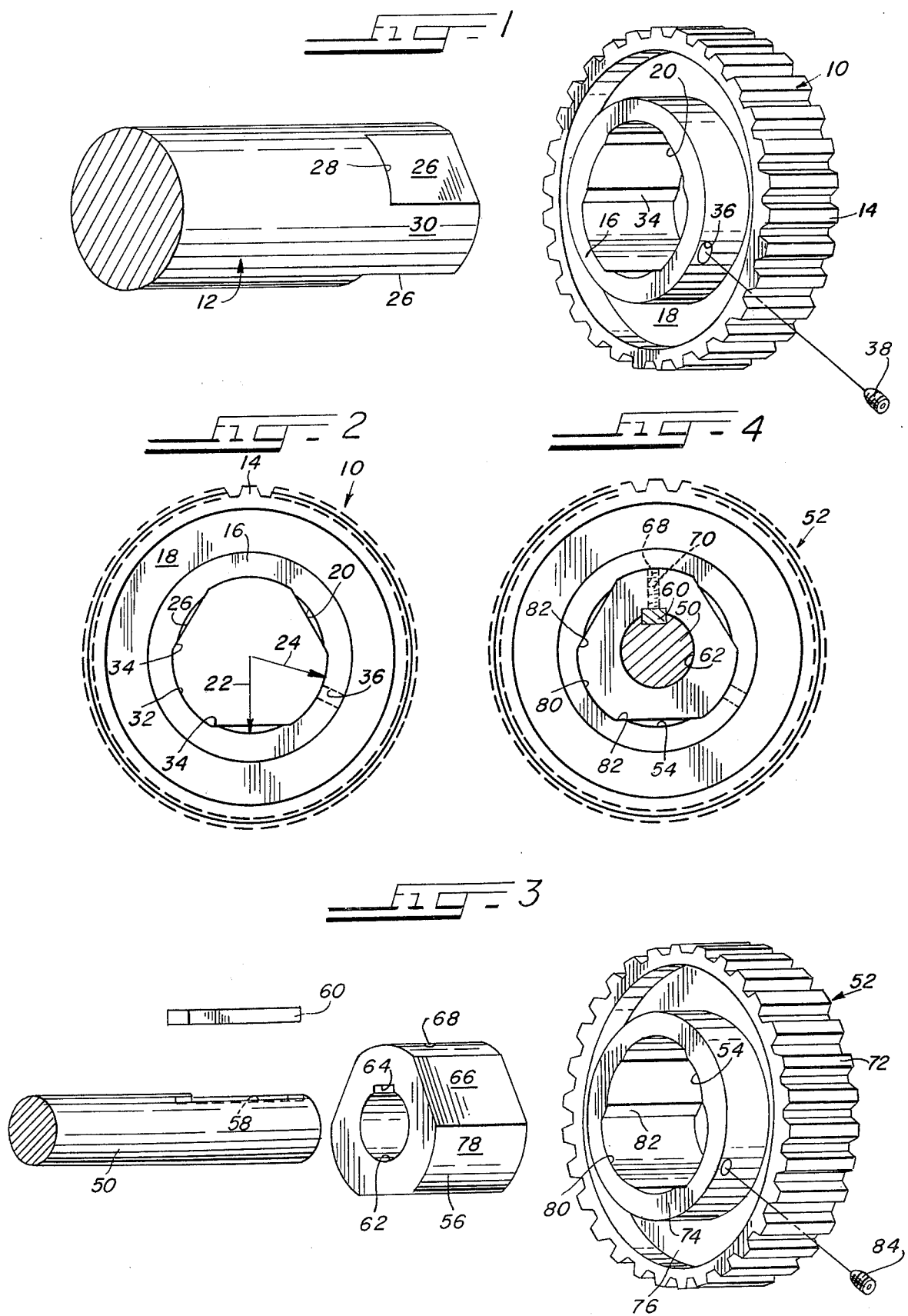

4,006,993

SHAFT MOUNTING ARRANGEMENT

BACKGROUND OF THE INVENTION

In industrial power transmission arrangements, the keyway is the almost universally accepted medium to secure gears, sprockets, bosses, bearings and other power transmission devices to a shaft, so as to rotate therewith, without relative rotation between the shaft and the transmission member. However, a key is a stress riser by its engaging only one location at the circumference of a shaft and by its sharp, abrupt edges. In some uses, such as for example, with gears, keyways make the gears difficult to balance. In the middle of a shaft, milling a keyway is awkward and time-consuming machine work.

Other well known methods of securing a power transmission device to a shaft include the use of splines and polygon connections.

Splines are very satisfactory, but generally too expensive for small industrial production quantities of some products. Polygon connections include special shaft and bore shapes which must be precision formed. These connections are suitable for heavy shock load, but because the shafts have to be precision formed and ground — an expensive manufacturing operation — their use is generally limited to special purposes.

Another form of connection for adapting a power transmission member to a shaft is the tapered bushing. In this connection, the bore of the transmission member must be tapered to match the bore of the bushing. Machine bolts or cap screws are used to draw the tapered bushing into seating engagement with the bore of the transmission product. The screws must be tightened alternatively and progressively until the bushing is pulled up tight — a time consuming operation, which is manually performed.

THE INVENTION

According to this invention, an improved shaft mounting arrangement comprises a shaft of a given diameter having a plurality of substantially equally spaced flats on one portion, the flats being separated by generally equal arcuate surfaces, the radii of which are equal. The flats preferably terminate in shoulders to form a stop for the transmission part to be connected thereto. The shaft may be initially formed to the desired shape or may be milled from bar stock or a cylindrical shaft.

The transmission part may be a gear, bearing, bushing lever, crank, torque arm or the like, with a cylindrical bore of a diameter less than the diameter of the shaft. During the basic manufacture of the transmission part, its bore need not be precisely finished for use in this arrangement. For use in the mounting arrangement according to this invention, the bore is preferably subjected to a machining operation as by using broaching equipment to provide depressions having circumferential walls corresponding in radial and circumferential dimensions to the arcuate surfaces of the shaft. Thus, the depressions will be flanked by flat surfaces which are each adjacent to a portion of the original bore of the part.

The shaft and power transmission part are lightly press-fitted together, so that the flats on the shaft are in juxtaposition to the corresponding flat surfaces of the bore, and the arcuate surfaces of the shaft contact the arcuate surfaces of the depressions.

To further secure the parts, a hole may be drilled and tapped in the transmission part to receive a set screw to frictionally contact the shaft. The position of this hole is not critical.

This arrangement can also be used to replace a tapered or other configuration bushing used to adapt a transmission part to a keyed shaft of much smaller diameter than the bore of the transmission part. In this usage, a cylindrical bushing is used. The bore of the bushing is provided with an axially extending keyway to receive a key which is also received in the keyway of the shaft. The external surface of the bushing is preferably machined to provide the plurality of spaced flats and the bore the transmission part is preferably machined and drilled and the parts are connected as previously described.

In this usage, the bushing is also drilled and tapped to receive a set screw for frictionally engaging the key. If desired, the transmission part may also be drilled to provide access to this set screw, permitting removal of the bushed transmission part from the shaft without disturbing the connection between the part and the bushing.

THE DRAWINGS

FIG. 1 is an exploded perspective view of a preferred shaft mounting arrangement according to this invention wherein the shaft is fitted directly with the transmission part, illustrated as a gear or sprocket;

FIG. 2 is a front view of the transmission part of FIG. 1 mounted with the shaft;

FIG. 3 is an exploded perspective view, similar to FIG. 1 of another embodiment, wherein the shaft is keyed and a bushing, constructed according to this invention, joins the part to the shaft;

FIG. 4 is a front view of the transmission part of FIG. 3 mounted on the shaft by means of the bushing;

DETAILED DESCRIPTION

Figure 5:
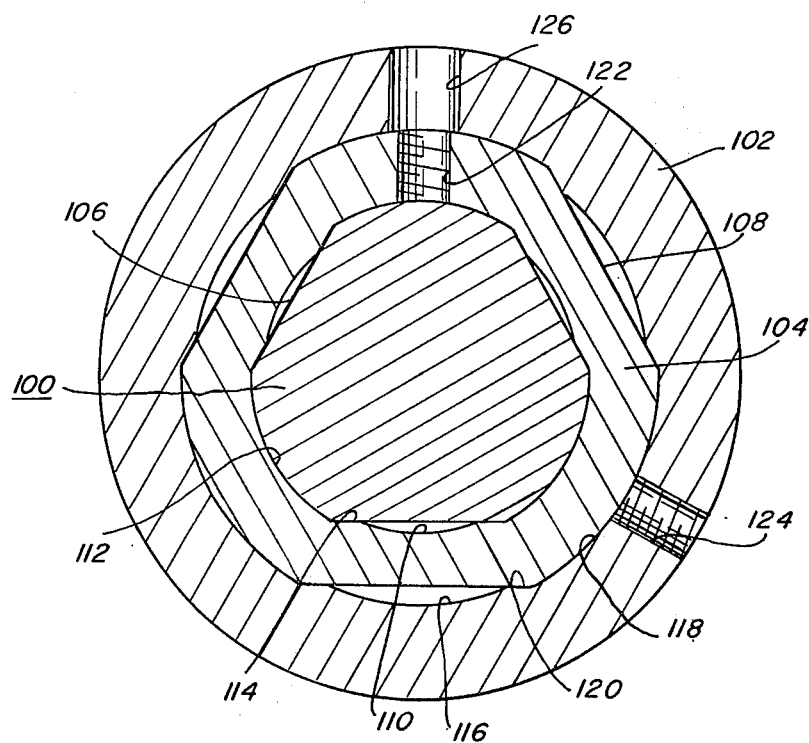
FIG. 5 is a front view, similar to FIG. 2, illustrating another embodiment of this invention.

Attention is directed to FIGS. 1 and 2, illustrating a preferred embodiment of this invention, in which a power transmission device, here illustrated as a gear or sprocket 10, is drivingly connected to a shaft 12. The gear or sprocket 10 has an external toothed periphery 14 connected to a hub 16 by a web 18, it being understood that the illustrated form of gear or sprocket is merely for purposes of description and not limitation; it should also be understood that the description, while being directed to a gear or sprocket is also applicable to other power transmission devices, such as bearings, bosses, and other power transmission devices.

The gear or sprocket hub 16 has a bore which is generally identified as 20, and before being processed accordingly to this invention, has a radius 22 (see FIG. 2). The shaft 12 is generally cylindrical with a radius 24 larger than the radius 22. To lock the gear 10 to the shaft 12, one end of the shaft is milled to provide a plurality of preferably equally spaced flats 26 each of which terminate in a shoulder 28. The shoulder 28 functions as a stop for the gear hub 16 when the part is assembled on the shaft. Arcuate surfaced areas 30 of the shaft are located between adjacent flats 26.

The bore 20 of the gear 10 is subjected to a broaching operation to remove material and form a plurality of preferably equally spaced zones to provide arcuate surfaced areas 32 each having a radius substantially equal to the radius of the shaft and equal in surface area and spacing to the areas 30. Flat surface areas 34 flank each area 32 and are formed and angled to engage a flat 26 when the shaft and gear are drivingly connected. If desired, the hub 16 is drilled and tapped at 36 to receive a setscrew 38 to engage the shaft 12. The location of the setscrew is not critical. A light press fit is generally desirable when the shaft 10 is inserted into the broached bore 20, such that the assembly, in a front view, appears as in FIG. 2. After assembly, the setscrew 38 is turned down to frictionally engage the shaft and to insure the connection.

FIGS. 3 and 4, to which attention is now directed, illustrate another embodiment of the invention. In this embodiment, a shaft 50 is to be drivingly connected to a gear or sprocket 52 having a bore 54 of much larger diameter than that of the shaft. To connect the gear and shaft, a bushing 56 is used.

The shaft 50 has an axially keyway 58 to receive a key 60, and the bushing 56 has a bore 62 of a diameter substantially equal to that of the shaft and is provided with a keyway 64 to receive the key 60 when the bushing and shaft are connected. The exterior of the bushing is milled to provide preferably equally spaced flats 66 and is drilled and tapped at 68 to receive a setscrew 70 for frictionally engaging the key 60 to insure the connection between the shaft and the bushing. Before milling the flats 66, the bushing was substantially cylindrical in shape, so after milling, the flats 66 are separated by arcuate surfaced areas 78, the radius of which is equal to the radius of the cylindrical bushing.

The gear or sprocket 52 has an exterior toothed periphery 72, a hub 74, a connecting web 76 and the bore 54.

The bore 54 is broached to provide spaced, arcuate surfaced areas 80 for engagement with the areas 78 of the bushing and flat areas 82 for engagement with the flats 66 of the bushing. As in the previously described embodiment, a light press-fit between the bushing and the gear is desirable. Also, the hub may be drilled and tapped to receive a setscrew 84 to frictionally engage the bushing, if desired.

Using the arrangement of FIGS. 3 and 4 permits the connection of existing shafts and a wide variety of power transmission devices having various hub bores by the use of various sizes of bushings, each being machined as described.

FIG. 5 illustrates another embodiment of the invention in which a shaft 100 is drivingly connected to a power transmission device 102 by a bushing 104. In this embodiment, the shaft 100 is milled to provide equally spaced flats 106 while the bushing 104 is milled to provide equally spaced flats 108. The bore 110 of the bushing 104 is broached to provide arcuate surfaced areas 112 each flanked by a flat surface 114 while the bore 116 of the transmission device is broached to provide arcuate surfaced areas 118 each flanked by a flat surface 120.

As in the previous embodiments, the parts are assembled with a light press fit, i.e., the shaft is received in the broached bushing bore, and that in turn is received in the broached bore of the power transmission part. Suitable drilled and tapped openings 122, 124, may be provided in the bushing and the transmission part, respectively, for set screws to frictionally engage the shaft and the bushing respectively. It is to be noted that access to an interior set screw can be provided by a suitable, aligned opening, as for example, opening 126.

Figure 6:
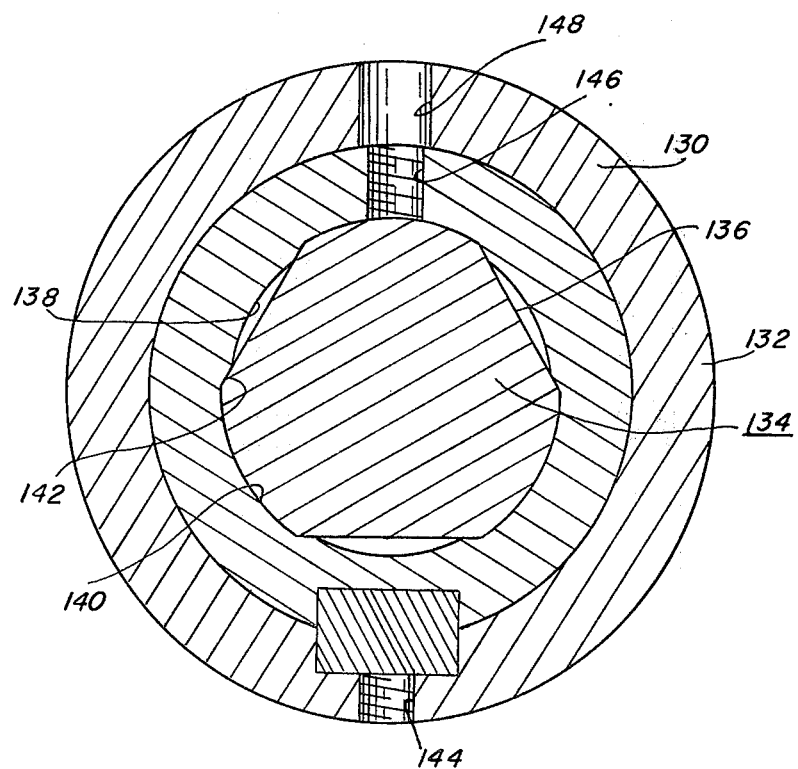
FIG. 6 is a front view, similar to FIG. 2, illustrating still another embodiment of this invention.

The FIG. 6 embodiment is similar to that of FIG. 5 except that it is applicable to a bored bushing 130 which is keyed to a transmission part 132. The shaft 134 is milled to provide flats 136, and the bore 138 of the bushing 130 is broached to provide arcuate surfaced areas 140 each flanked by a flat surface 142. The transmission part 132 is drilled and tapped at 144 to receive a set screw to frictionally engage the key; the bushing 130 is drilled and tapped at 146 to receive a set screw to frictionally engage the shaft 134 and the transmission part 132 is drilled at 148 to provide access to the set screw in the opening 146. The parts are assembled as previously described.

In the description above, the parts are milled, broached or machined in some manner to provide the proper configurations. It should be understood that the shaft and/or the power transmission parts may be initially formed with the proper shapes. For example, such can be made by centering powder metals or may be cast, as by the lost wax process.

As evidenced by the drawings, the flats or flat surfaces 26, 66, 106, 108, 136 are chordal surfaces of their respective cylindrical members.

I claim:
1. A connecting arrangement comprising:
   a cylindrical member having a plurality of flat surfaces spaced around at least a portion of its periphery, each flat surface being spaced from an adjacent flat surface by an arcuate surface, the radius of which equals the radius of the cylindrical member, said flat surfaces being chordal surfaces of said cylindrical member;
   an annular member having a bore with a plurality of arcuate surfaces of at least two different radii and a plurality of flat surfaces;
   the radius of one group of arcuate surfaces of said annular member being substantially equal to the radius of the arcuate surfaces of said cylindrical member and being in engagement therewith, the flat surfaces of said annular member contacting juxtapositioned flat surfaces of said shaft, and said other arcuate surfaces of said annular member having a smaller radius than that of said one group and each such other arcuate surface being flanked by a flat surface of said bore.
2. An arrangement for drivingly connecting a power transmission part such as a gear or sprocket and the like to a shaft comprising:
   a cylindrical shaft having a plurality of flat surfaces spaced around at least a portion of its periphery, each flat surface being spaced from an adjacent flat surface by an arcuate surface, the radius of which equals the radius of the cylindrical shaft, said flat surfaces being chordal surfaces of said cylindrical shaft;
   a power transmission part having a central bore with a plurality of arcuate surfaces of at least two different radii and a plurality of flat surfaces said flat surfaces joining adjacent arcuate surfaces;
   the radius of one group of arcuate surfaces of said part being substantially equal to the radius of the arcuate surfaces of said shaft and being in engagement therewith, the flat surfaces of said part contacting juxtapositioned flat surfaces of said shaft, said other arcuate surfaces of said part having a smaller radius than that of said one group and each such other arcuate surface being flanked by a flat surface of said bore.
3. An arrangement as recited in claim 2 wherein said flat surfaces of said shaft are substantially equal to each other and equally spaced with respect to the shaft.
4. An arrangement as recited in claim 2 wherein said arcuate surfaces of said shaft are equal to one another and are equally spaced with respect to the shaft.

* * * * *